(12) United States Patent
Chen et al.

(10) Patent No.: US 7,330,348 B2
(45) Date of Patent: Feb. 12, 2008

(54) MOUNTING APPARATUS FOR DATA STORAGE DEVICE

(75) Inventors: Yun-Lung Chen, Tu-Cheng (TW); Jun Tang, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 217 days.

(21) Appl. No.: 11/317,273

(22) Filed: Dec. 23, 2005

(65) Prior Publication Data
US 2007/0019377 A1    Jan. 25, 2007

(30) Foreign Application Priority Data
Jul. 19, 2005    (CN) .................. 2005 2 0061856 U

(51) Int. Cl.
*G06F 1/16*    (2006.01)
(52) U.S. Cl. ....................... 361/685; 248/801; 365/151
(58) Field of Classification Search .......... 248/222.11, 248/801; 211/26; 365/151; 312/223.1–223.2; 361/679–687, 724–727
See application file for complete search history.

(56) References Cited

U.S. PATENT DOCUMENTS

| 4,979,909 | A | 12/1990 | Andrews |
| 6,614,654 | B2 * | 9/2003 | Liu et al. ................... 361/685 |
| 6,625,014 | B1 | 9/2003 | Tucker et al. |
| 6,646,872 | B1 | 11/2003 | Chen |
| 6,667,880 | B2 * | 12/2003 | Liu et al. ................... 361/685 |
| 6,760,226 | B2 * | 7/2004 | Chen ......................... 361/725 |
| 2007/0171699 | A1 * | 7/2007 | Chen et al. ................. 365/151 |

* cited by examiner

*Primary Examiner*—Hung Van Duong
(74) *Attorney, Agent, or Firm*—Morris Manning Martin LLP; Tim Tingkang Xia, Esq.

(57) ABSTRACT

A data storage device assembly includes a data storage device having two sidewalls, each sidewall having a first positioning post; a supporting bracket having two sidewalls, one of the sidewalls defining a guiding slot for locating the first positioning post; a driving member movably attached to the supporting bracket, the driving member having a sliding post; a pivoting member pivotally located between the driving member and the supporting bracket, the pivoting member defining a sliding slot for the sliding post to slide therein, and having a stopping block for locating the first positioning post; and a first elastic component for urging the driving member to move towards an original position. When the driving member is pushed, the sliding post of the driving member slides in the sliding slot to urge the pivoting member to rotate, thereby causing the first positioning post to disengage from the stopping block.

20 Claims, 5 Drawing Sheets

MOUNTING APPARATUS FOR DATA STORAGE DEVICE

BACKGROUND OF THE INVENTION

1. Field of the Invention

The present invention relates to mounting apparatuses, and more particularly to a mounting apparatus which readily secures a data storage device therein and allows convenient removal of the data storage device therefrom.

2. General Background

Data storage devices, such as hard disk drives, optical disk drives, and floppy disk drives, are crucial components for communications and handling of data in a computer system. In a computer enclosure of a typical personal computer, there are generally two disk drive brackets mounted therein. Usually, a variety of disk drives may be received in the disk drive brackets, which are then secured into the enclosure. There are many methods to mount data disk drives in the disk drive brackets in the enclosure. One conventional method is that many screws are employed to mount the data disk drives in the disk drive brackets. A conventional mounting apparatus includes an upper disk drive bracket and a lower disk drive bracket mounted in a computer enclosure. The opposite sides of upper and lower disk drive brackets define a plurality of through holes. A pair of joining edges is formed on opposite sides of a bottom of the lower disk drive bracket. Fixing holes are defined in the joining edges. The lower disk drive bracket is secured to a bottom of the upper disk drive bracket by screws. Then, a plurality of screws extends through the corresponding through holes of the upper and lower disk drive brackets to engage in threaded holes of disk drives, thereby securing the disk drives in the upper and lower disk drive brackets. However, not only securing the disk drive brackets is unduly painstaking and time-consuming, but also removal of the disk drives is similarly painstaking and time-consuming.

A typical mounting apparatus which utilizes screws and locating means for securing a data storage device in a computer enclosure is disclosed. The enclosure comprises a bottom plate and a side plate. The side plate forms a plurality of locating catches extending from an inner side thereof. The bottom plate includes a pair of slots and a pair of upright tabs. The data storage device defines a plurality of locating apertures in both sides thereof. A board is attached to an outside surface of the data storage device. From the board a pair of bars extrude from a bottom edge and a plurality of inward locating catches from an inner side thereof. In assembly, the data storage device is inserted into the enclosure along the side plate. When the data storage device reaches the upright tabs, the locating catches of the enclosure engages in the apertures of the data storage device, the locating bars of the board pivotally engaging in the slot of the bottom plate. A screw is then extended through the board to engage with the data storage device. However, the above-described operation of the mounting assembly is unduly complicated, and may result in damage to components in the enclosure.

What is needed, therefore, is a mounting apparatus with a simplified configuration, that conveniently allows the removal and attachment of a data storage device from and into a computer enclosure.

SUMMARY

A data storage device assembly includes a data storage device having two sidewalls, each sidewall having a first positioning post; a supporting bracket having two sidewalls, one of the sidewalls defining a guiding slot for locating the first positioning post; a driving member movably attached to the supporting bracket, the driving member having a sliding post; a pivoting member pivotally located between the driving member and the supporting bracket, the pivoting member defining a sliding slot for the sliding post to slide therein, and having a stopping block for locating the first positioning post; and a first elastic component for urging the driving member to move towards an original position. When the driving member is pushed, the sliding post of the driving member slides in the sliding slot to urge the pivoting member to rotate, thereby causing the first positioning post to disengage from the stopping block.

Other advantages and novel features will be drawn from the following detailed description of preferred embodiments with the attached drawings, in which:

DETAILED DESCRIPTION OF THE EMBODIMENTS

Figure 1:
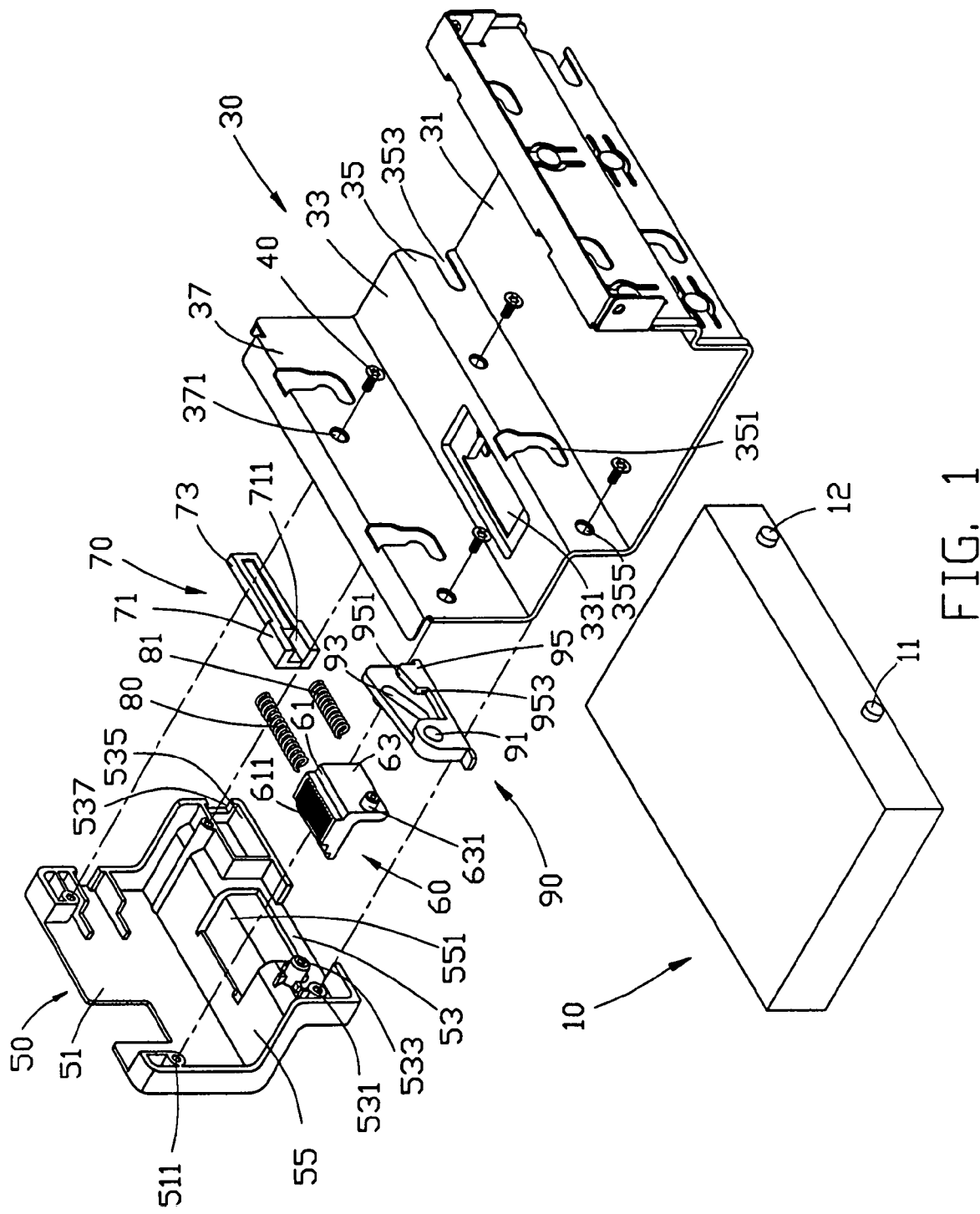
FIG. 1 is an exploded, isometric view of a mounting apparatus in accordance with a preferred embodiment of the invention, the mounting apparatus including a supporting bracket, a locating member, a driving member, a resisting member, a first and second spring, a pivoting member, and a data storage device.
Figure 2:
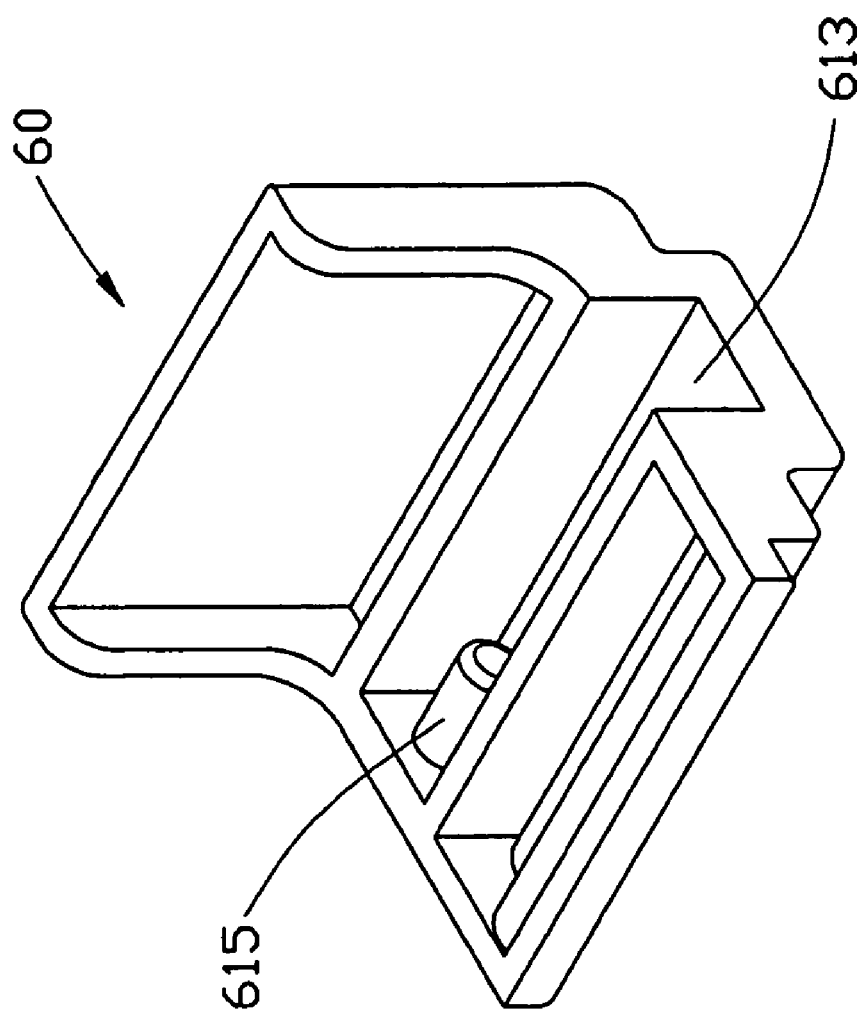
FIG. 2 is an enlarged view of the driving member of FIG. 1, but viewed from another aspect.

Referring to FIGS. 1 and 2, a mounting apparatus in accordance with a preferred embodiment of the invention which secures a data storage device 10 to a chassis of an electronic system like a computer, includes a supporting bracket 30, a plurality of screws 40, and a securing apparatus including a positioning member 50, a driving member 60, a resisting member 70, a first and second spring 80, 81, and a pivoting member 90. In an alternative embodiment, the first and second spring 80, 81 can be other elastic components such as resilient cylinders.

The data storage device 10 may be an optical disk drive, a floppy disk drive, a hard disk drive, or some other device. The data storage device 10 has two opposite sidewalls. First and second positioning posts 11, 12 extend from each of the sidewalls of the first data storage device 10.

The supporting bracket 30 is secured to the chassis by a well-known means. The supporting bracket 30 includes a bottom wall 31 and two opposite sidewalls. Each of the sidewalls is step-shaped. Each of the two opposite sidewalls of the supporting bracket 30 includes a lower sidewall 35, an upper sidewall 37, and a shoulder 33 vertically connected with the lower and upper sidewalls 35, 37. A receiving space is configured within the two opposite lower sidewalls 35 and the bottom wall 31, for receiving the data storage device 10. One J-shaped guiding slot 351 and one horizontal guiding slots 353 are defined in each of the lower sidewalls 35. A pair of through holes 355 is defined in one of the two lower sidewalls 35 for extension of the screws 40 therethrough, and a pair of through holes 371 is defined in one of the two upper sidewalls 37 for extension of the screws 40 therethrough, corresponding to the two through holes 355. A rectangular opening 331 is defined in the shoulder 33 adjacent to the J-shaped guiding slot 351.

The positioning member 50 is firmly secured to one sidewall of the supporting bracket 30. The positioning member 50 is step-shaped, and includes a first sidewall 51, a second sidewall 53, and a connecting wall 55 connecting the first and second sidewall 51, 53. A pair of struts 511 extends from an inner side of the first sidewall 51 of the positioning member 50, corresponding to the pair of through holes 371. A pair of struts 531 extends from an inner side of the second sidewall 53 of the positioning member 50, corresponding to the pair of through holes 355. Each of the struts 511, 531 has an internal threaded hole defined therein to engage with each of the screws 40. The screws 40 pass through the through holes 355, 371 for securely fastening the positioning member 50 to the supporting bracket 30. A pivot pin 533 extends from the inner side of the second sidewall 53, for pivoting the pivoting member 90 thereabout. A receiving compartment 535 is formed on the inner side of the second sidewall 53, for receiving the second spring 81 and the resisting member 70 therein. A cutout 537 is defined in the receiving compartment 535 for extension of the resisting member 70 therethrough. A receiving space 551 is jointly defined in the inner side of the second sidewall 53 and the connecting wall 55, for receiving the first spring 80 and the driving member 60 therein.

The driving member 60 is generally L-shaped. The driving member 60 is formed to have a horizontal portion 61 and a vertical portion 63. An operating portion 611 is formed on a top surface of the horizontal portion 61. A receiving slot 613 is defined in a lower surface of the horizontal portion 61. A protruding post 615 extends horizontally from an end of the receiving slot 613. A sliding post 631 extends horizontally from the vertical portion 63.

The resisting member 70 has a wide portion 71 slidably received in the receiving compartment 535 of the positioning member 50, and a narrow portion 73 slidably retained in the cutout 537 of the positioning member 50. A receiving slot 711 is defined in the wide portion 71 for receiving an end of the second spring 81.

The pivoting member 90 defines a pivoting hole 91 at an end thereof, corresponding to the pivot pin 533 of the positioning member 50. A slanted sliding slot 93 is also defined in the pivoting member 90. A stopping block 95 is formed on an inner side of the pivoting member 90. The stopping block 95 has a slanted top surface 951 for the first positioning post 11 of the data storage device 10 sliding thereon, and a vertical side surface 953 for preventing the first positioning post 11 from moving in a horizontal direction.

Figure 3:
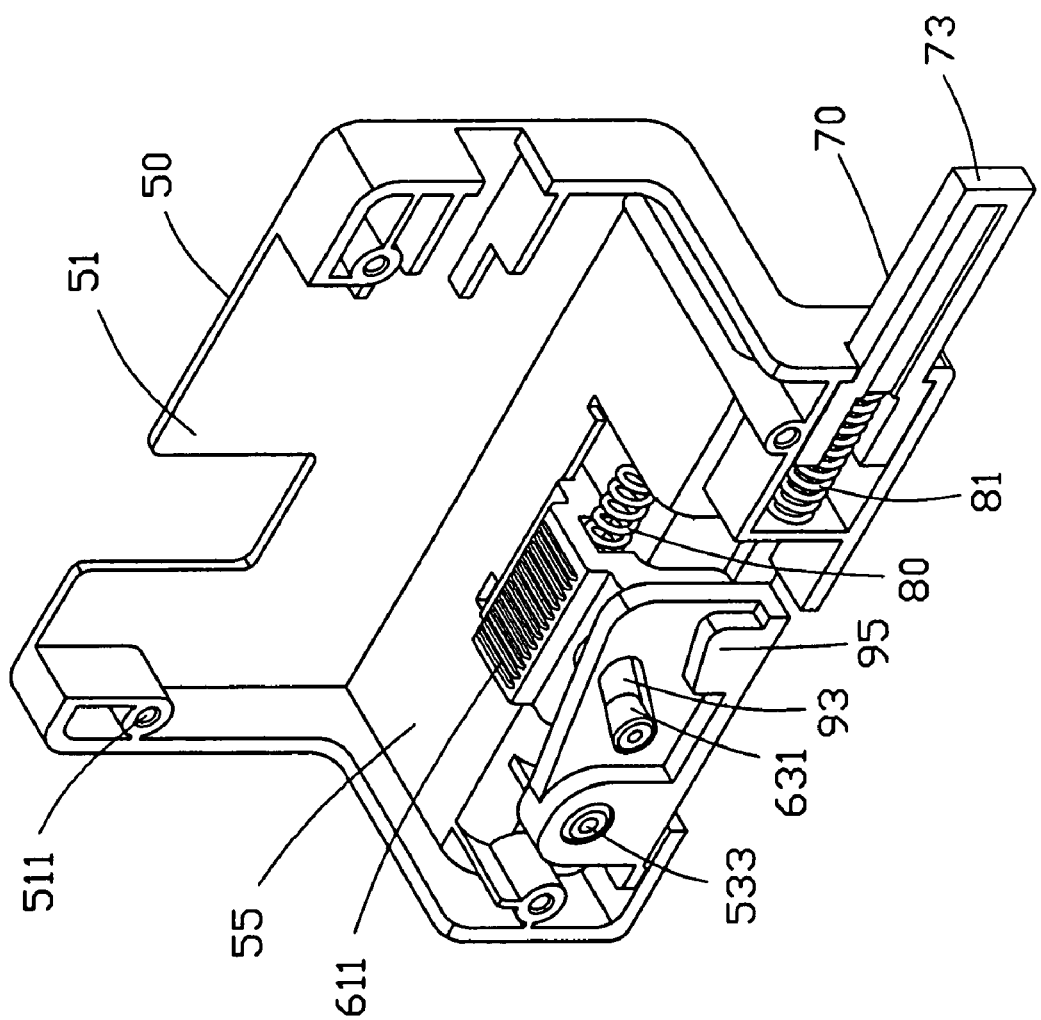
FIG. 3 is a partially assembled view of the mounting apparatus of FIG. 1, showing all of the parts of the mounting apparatus attached to the supporting bracket except the data storage device.
Figure 4:
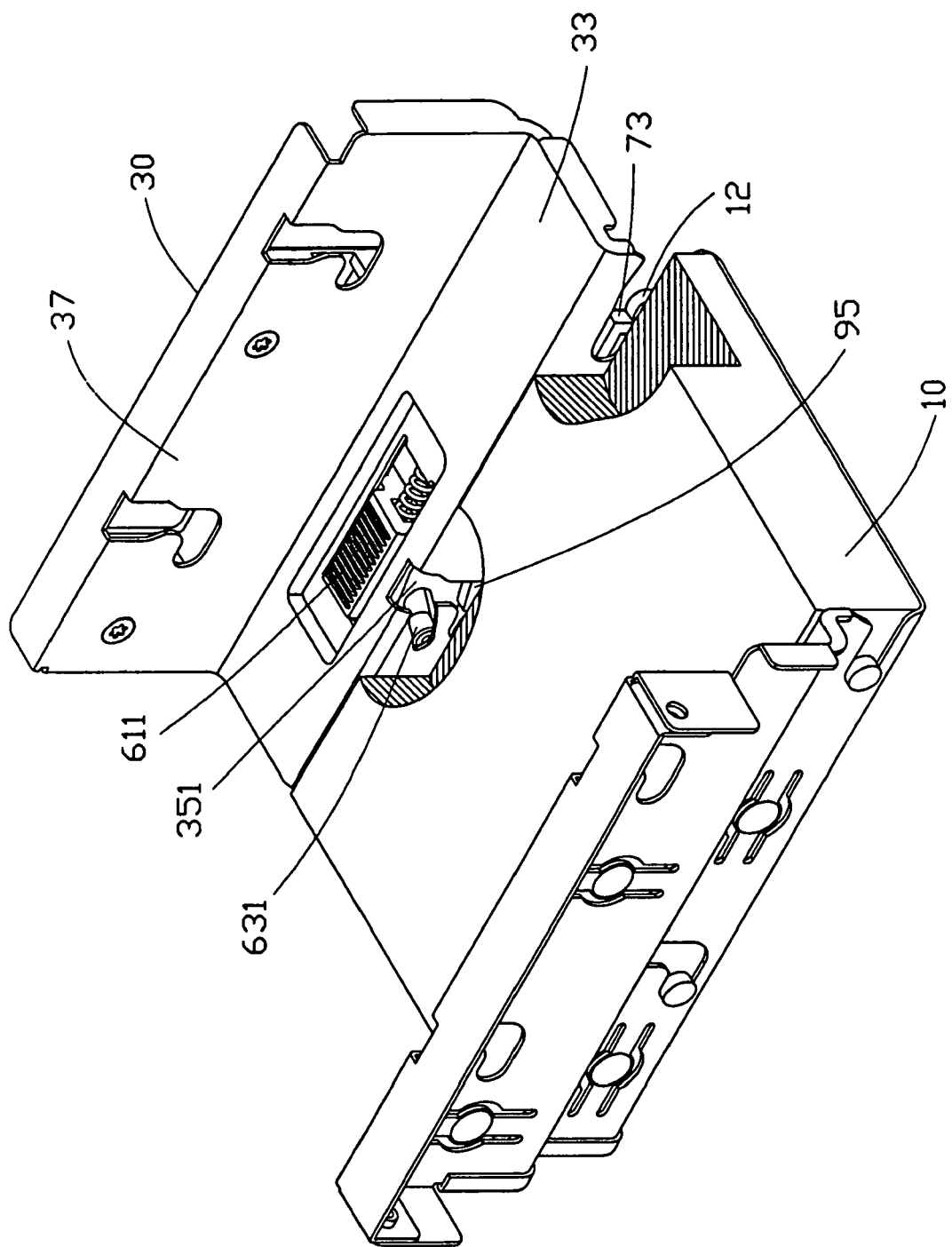
FIG. 4 is an assembled view of the mounting apparatus of FIG. 1, showing the data storage device partially cutaway.

Referring also to FIGS. 3 and 4, before the data storage device 10 is attached to the supporting bracket 30, a plurality of screws 40, a positioning member 50, a driving member 60, a resisting member 70, a first and second spring 80, 81, and a pivoting member 90 are assembled together. Firstly, one end of the first spring 80 is disposed on the protruding post 615 of the driving member 60. Then the driving member 60 together with the first spring 80 is received into the receiving space 551 of the positioning member 50, and the other end of the first spring 80 resists compressedly against an inner side of the receiving space 551. The wide portion 71 of the resisting member 70 is received into the receiving compartment 535 fully, and the narrow portion 73 of the resisting member 70 extends through the cutout 537. Simultaneously, the second spring 81 is compressedly received in the receiving compartment 535 of the positioning member 50 and the receiving slot 711 of the resisting member 70. Furthermore, the pivot pin 533 of the positioning member 50 runs through the pivoting hole 91 of the pivoting member 90, and the sliding post 631 of the driving member 60 runs through the sliding slot 93 of the pivoting member 90, thereby pivotally attaching the pivoting member 90 to the positioning member 50. Finally, the operating portion 611 of the driving member 60 runs through the opening 331 of the shoulder 33, and four screws 40 are inserted through the through holes 355, 371 respectively to engage in a corresponding one of the threaded holes of the struts 511, 531, thereby firmly securing the positioning member 50, the driving member 60, the resisting member 70, and the pivoting member 90 to the supporting bracket 30. Thus, when the operating portion 611 of the driving member 60 is pushed horizontally, the sliding post 631 of the driving member 60 slides in the slanted sliding slot 93 of the pivoting member 90, thereby urging the pivoting member 90 to pivot about the pivot pin 533 of the positioning member 50.

In attachment of the data storage device 10, the first positioning posts 11 of the data storage device 10 are first engagingly received in the corresponding guiding slots 351 of the lower sidewalls 35 and slide along therein. One of the first positioning posts 11 of the data storage device 10 presses against the slanted top surface 951 of the stopping block 95, thereby urging the pivoting member 90 to rotate around the pivot pin 533 of the positioning member 50. Simultaneously, the sliding slot 93 guides the sliding post 631 to move horizontally, thereby causing the driving member 60 to compress the first spring 80. When the first positioning post 11 arrives at a bottom end of the guiding slot 351, the second positioning posts 12 align with the guiding slots 353 respectively. Then the data storage device 10 is pushed horizontally to urge the first positioning post 11 to move towards a distal end of the guiding slot 351. Simultaneously, the second positioning post 12 slides in the guiding slot 353 and resists against the narrow portion 73 of the resisting member 70 to move horizontally the resisting member 70, thereby the second spring 81 being further compressed. When the first positioning post 11 slides over the stopping block 95, the driving member 60 returns to an original position due to rebounding of the first spring 80, and the sliding post 631 slides in the sliding slot 93 urging the pivoting member 90 to pivot upward. Therefore, the first positioning post 11 is stopped by the vertical side surface 953 of the stopping block 95. Thus, the data storage device 10 is securely mounted in the supporting bracket 30.

Figure 5:
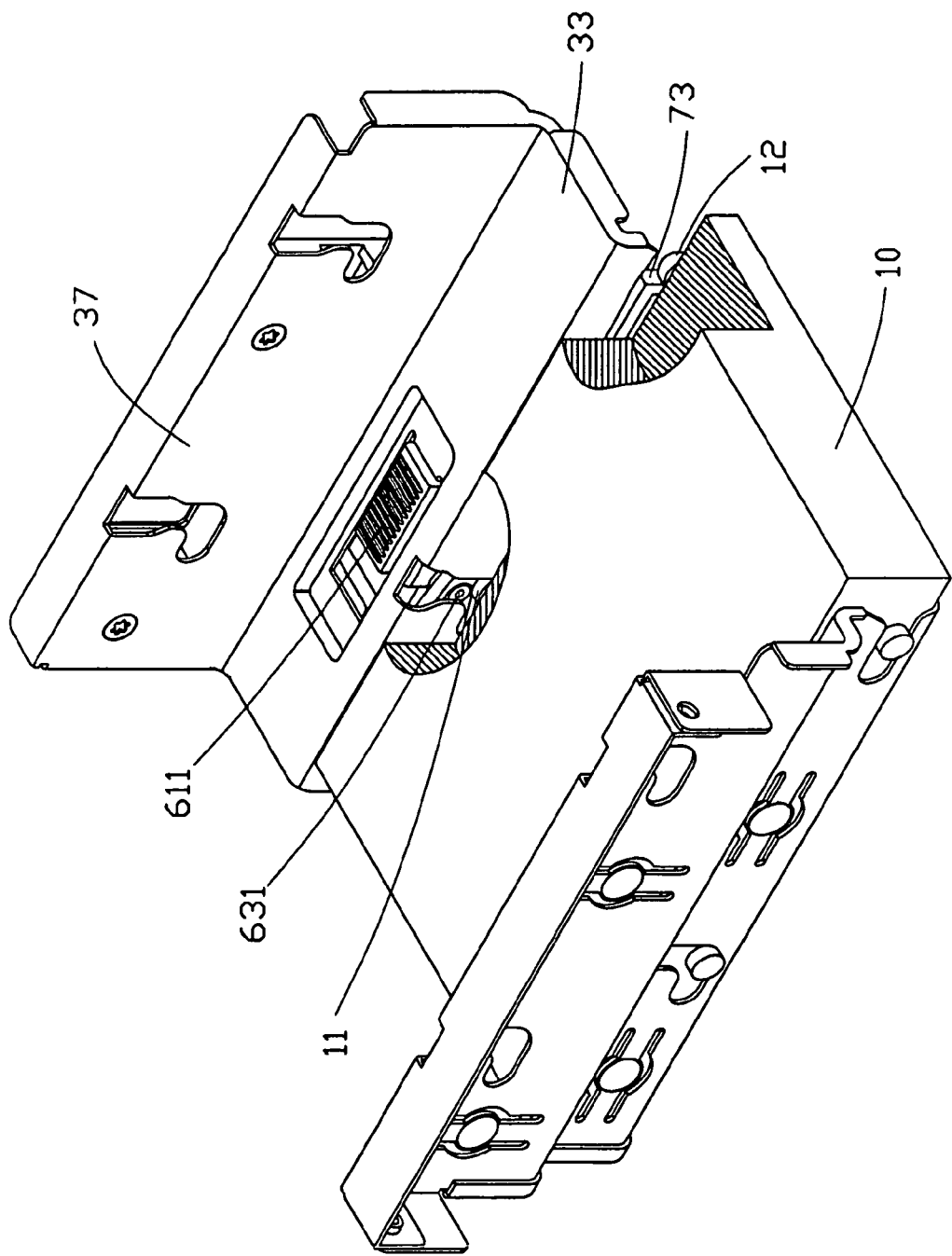
FIG. 5 is a disassembled view of the mounting apparatus of FIG. 4, showing the data storage device partially cutaway unlocked from the supporting bracket.

Referring also to FIG. 5, in removal of the data storage device 10, when the operating portion 611 of the driving member 60 is first pushed horizontally to compress the first spring 80, the sliding post 631 slides in the sliding slot 93, thereby urging the pivoting member 90 to pivot down. When the vertical side surface 953 of the stopping block 95 is below the first positioning post 11, the first positioning post 11 is unlocked. Simultaneously, the narrow portion 73 of the resisting member 70 drives the second positioning post 12 of the data storage device 10 to move horizontally the data storage device 10 due to rebounding of the second spring 81, until the first positioning post 11 resides over the slanted top surface 951 of the stopping block 95. Then, the operating portion 611 of the driving member 60 is released. The driving member 60 returns to an original position due to rebounding of the first spring 80. The sliding post 631 drives the pivoting member 90 to pivot upward. Therefore, the slanted top surface 951 of the stopping block 95 urges the first positioning post 11 up, thereby the first and second positioning post 11, 12 disengaging from the guiding slot 351, 353 respectively. Thus, the data storage device 10 may be easily drawn out from the supporting bracket 30.

While the present invention has been illustrated by the description of preferred embodiments thereof, and while the preferred embodiments have been described in considerable detail, it is not intended to restrict or in any way limit the scope of the appended claims to such details. Additional advantages and modifications within the spirit and scope of the present invention will readily appear to those skilled in the art. Therefore, the present invention is not limited to the specific details and illustrative examples shown and described.

We claim:

1. A data storage device assembly comprising:
   a data storage device having two sidewalls, one of the sidewalls having a first positioning post;
   a supporting bracket for accommodating the data storage device, the supporting bracket having two sidewalls, one of the sidewalls defining a guiding slot for locating the first positioning post of the data storage device;
   a driving member movably attached to the supporting bracket, the driving member having a sliding post;
   a pivoting member pivotally located between the driving member and the supporting bracket, the pivoting member defining a sliding slot for the sliding post to slide therein, and forming a stopping block for stopping the first positioning post; and
   a first elastic component for urging the driving member to move towards an original position, whereby when the driving member is pushed, the sliding post of the driving member slides in the sliding slot to urge the pivoting member to rotate, thereby causing the first positioning post of the data storage device to disengage from the stopping block of the pivoting member.

2. The data storage device assembly as described in claim 1, further comprising a positioning member securely mounted on the supporting bracket for the driving member sliding thereon.

3. The data storage device assembly as described in claim 2, further comprising a resisting member movably received in the positioning member, and one of the sidewalls of the data storage device further having a second positioning post for the resisting member to resist against, thereby moving the data storage device.

4. The data storage device assembly as described in claim 3, further comprising a second elastic component for urging the resisting member to move towards an original position.

5. The data storage device assembly as described in claim 4, wherein the resisting member has a wide portion and a narrow portion thereof, and the positioning member having a receiving compartment formed thereon for receiving the wide portion and the second elastic component.

6. The data storage device assembly as described in claim 5, wherein the receiving compartment defines a cutout for extension of the narrow portion of the resisting member therethrough.

7. The data storage device assembly as described in claim 2, wherein the positioning member forms a pivot pin for the pivoting member rotating thereabout.

8. The data storage device assembly as described in claim 1, wherein the driving member has a protruding post for the first elastic component to be disposed thereon.

9. The data storage device assembly as described in claim 1, wherein the supporting bracket defines an opening for extension of the driving member therethrough.

10. The data storage device assembly as described in claim 1, wherein the stopping block has a slanted top surface for the first positioning post of the data storage device to slide thereon, and a vertical side surface for blocking the first positioning post of the data storage device.

11. A data storage device assembly comprising:
    a data storage device having a pair of opposite sidewalls, one of the sidewalls having a first positioning post and a second positioning post;
    a supporting bracket for accommodating the data storage device, the supporting bracket having a pair of opposite sidewalls, one of the sidewalls defining two guiding slots for locating the first and second positioning post of the data storage device respectively;
    a locking structure for locking or unlocking the first positioning post of the data storage device; and
    a resisting structure resisting against the second positioning post of the data storage device, wherein when the locking structure is unlocked, the resisting structure resists against the second positioning post of the data storage device to urge the first and second positioning post of the data storage device to automatically disengage from the corresponding guiding slots of the supporting bracket.

12. The data storage device assembly as described in claim 11, wherein the locking structure comprises a driving member, a pivoting member, and a first elastic component disposed on the driving member.

13. The data storage device assembly as described in claim 12, further comprising a positioning member securely mounted to the supporting bracket, the locking structure and the resisting structure movably attached to the positioning member, and the pivoting member pivotally mounted to the positioning member.

14. The data storage device assembly as described in claim 13, wherein the resisting structure comprises a resisting member for resisting against the second positioning post of the data storage device, and a second elastic component received in the resisting member and the positioning member, thereby urging the resisting member to return to an original position.

15. The data storage device assembly as claimed in claim 12, wherein the pivoting member defines a slanted sliding slot, and the driving member forms a sliding post for sliding in the slanted sliding slot, thereby urging the pivoting member to rotate.

16. The data storage device assembly as described in claim 15, wherein the pivoting member has a stopping block for stopping the first positioning post of the data storage device.

17. The data storage device assembly as described in claim 16, wherein the stopping block has a slanted top surface for the first positioning post sliding thereon, and a vertical side surface for blocking the first positioning post.

18. The data storage device assembly as described in claim 11, wherein the supporting bracket defines an opening for extension of the driving member therethrough.

19. An electronic system comprising:
    a device for extending function of said electronic system removably installable in said electronic system;
    a supporting bracket disposed in said electronic system for accommodating said device therein, said device movable between a first position thereof where said device is secured to said bracket and a second position thereof where said device is free to remove out of said bracket; and a securing apparatus attachable to said bracket and capable of interacting with at least two portions of said device spaced from one another, interaction of said securing apparatus with a first one of said at least two spaced portions of said device capable of securing said device to said bracket, and interaction of said securing apparatus with a second one of said at least two spaced portions of said device capable of urging said device to move from said first position thereof to said second position thereof.

20. The electronic system as described in claim 19, wherein said interaction of said securing apparatus with said first one of said at least two spaced portions of said device is performed by a pivoting member of said securing apparatus capable of pivotally moving in said securing apparatus, and said interaction of said securing apparatus with said second one of said at least two spaced portions of said device is performed by a resisting member capable of linearly moving in said securing apparatus.

* * * * *